April 18, 1950 J. H. GARDNER 2,504,678
MILK AND CREAM PRODUCT EMULSIFIER
Filed Oct. 13, 1947

INVENTOR.
JOHN H. GARDNER.
BY
Lockwood, Goldsmith & Galt,
ATTORNEYS.

Patented Apr. 18, 1950

2,504,678

UNITED STATES PATENT OFFICE 2,504,678

MILK AND CREAM PRODUCT EMULSIFIER

John H. Gardner, Daytona Beach, Fla., assignor, by decree of distribution, to Elizabeth Gardner Application October 13, 1947, Serial No. 779,619

13 Claims. (Cl. 259—4)

This invention relates to apparatus for emulsifying liquids, semi-plastic liquids and the like.

Heretofore for homogenizing and the like pressures in the neighborhood of 2000 pounds per square inch have been required.

The chief object of the present invention is to attain the same or better results by utilizing very much lower pressures such as from three to five hundred pounds per square inch with the result that a cream-like texture of the product is obtained.

The chief feature of the present invention resides in providing between a pair of discs a plurality of screens so disposed relative to each other and the discs that a tortuous passage is provided, the invention being of adjustable character as to the pressure mechanically imposed thereon.

Thus the screens act as a valve (and of adjustable type) through which the liquid is forced for emulsification.

Another feature of the invention resides in the construction and assembly of the same so that it may be disassembled readily for cleaning purposes.

A further feature of the invention is that the parts have a comparatively long life, as compared with a high pressure homogenizer, since exceptionally long life is inherent herein due to the reduction in wear by reason of the extremely low pressures utilized.

Other objects and features of the invention will be set forth more fully hereinafter.

The full nature of the invention will be understood from the accompanying drawings and the following description and claims.

The present invention is intended to be utilized with a low pressure pump, a supply of liquid to be emulsified and a container for the emulsified liquid. Such liquids comprise milk, cream, ice cream mix, other edible mixes, and non-edibles such as face creams, etc.

Figure 1:
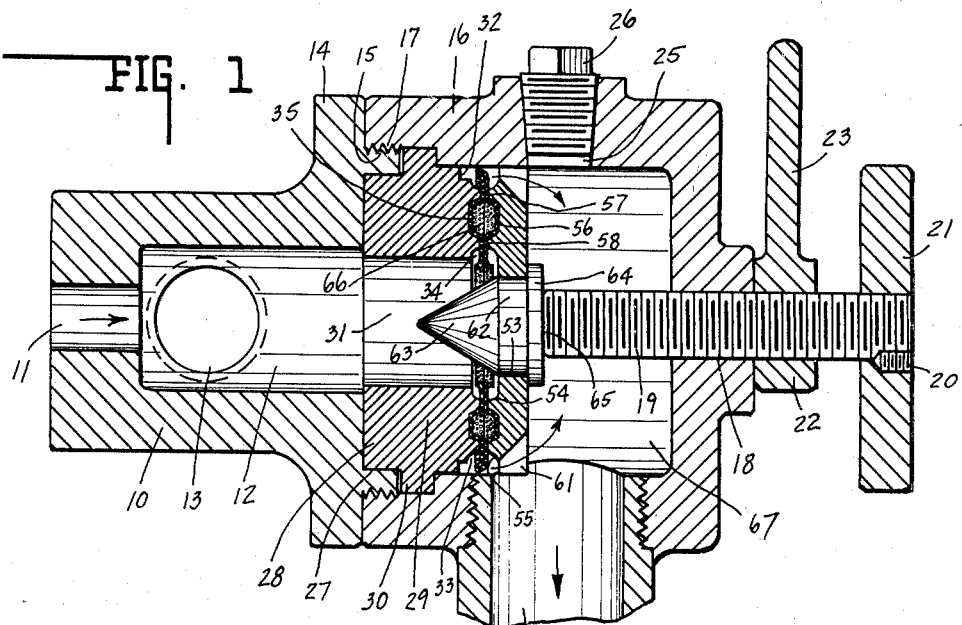
Fig. 1 is a central sectional view of the preferred embodiment of the invention.
Figure 2:
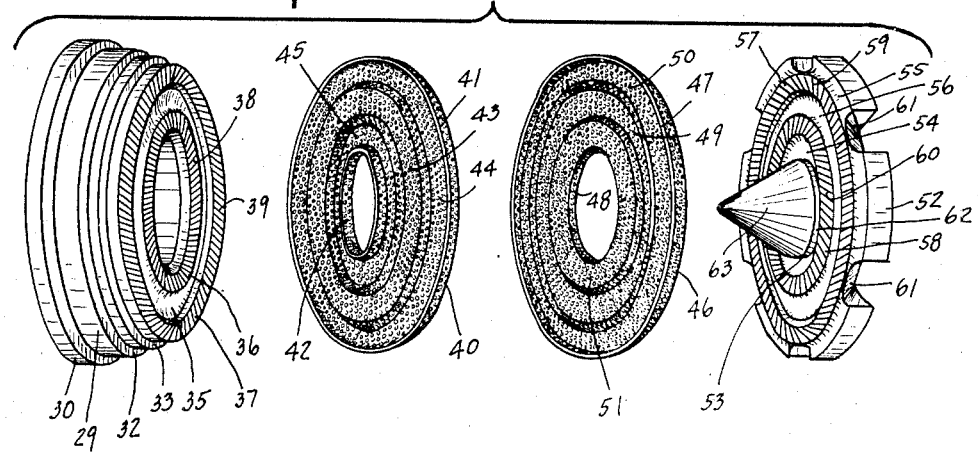
Fig. 2 is a disassembled or exploded view of the emulsifying elements of the invention.

In Fig. 1, 10 indicates a supply fixture having intake 11 adapted for connection to a source of liquid which liquid is pressure supplied thereto under the comparatively low pressure previously specified. Intake chamber 12 includes an outlet 13 for a gauge connection.

Fixture 10 is laterally flanged as at 14 and threaded as at 15 for rigid connection to a cup type body member 16 as at 17. The body opposite the intake 11 is threaded as at 18 to adjustably accommodate pressure screw 19, upon the exterior of which, as at 20, is a rotatable hand wheel or knob 21. A lock nut 22 having handle 23 is arranged to lock the screw in adjusted position.

The cup 16 has connected to it the discharge line 24. Opposite same is the cleanout opening 25 closed by removable plug 26. The fixture and cup together form a chamber in which is disposed the emulsifying elements held together by screw 19 against pressure separation, as hereinafter pointed out.

The body attaching end of fixture 10 includes a well 27 to receive and nest the end 28 of a heavy disc 29. A flange 30 therein is clamped between the fixture and body as shown, thus rigidly holding the disc in predetermined position.

The disc 29 has extending therethrough the central passage 31 and same is in free communication with intake chamber 12. The forward end of disc 29 is reduced as at 32 and the free end is further reduced as at 33. At the passage end the same is enlarged at 34. The forward face is annularly channeled as at 35 forming two concentric ridges 36 and 37. The outer faces thereof are minutely grooved and the grooves while broadly radially directed are oppositely inclined as at 38 and 39 respectively. This effects a change of liquid flow direction as hereinafter described.

A foraminated screen 40 is disposed in contact with said disc and includes peripheral bead portion 41 and internal collar portion 42. Therebetween and spaced from both is the annular portion 43. Therebetween are disposed the coplanar concentric portions 44 and 45. The foraminations are holes of minute size.

A second foraminated screen 46 is disposed in contact with screen 40. It includes peripheral bead portion 47 and internal collar portion 48, the same being oppositely directed. Therebetween and spaced from both is the annular portion 49. Therebetween is disposed the coplanar concentric portions 50 and 51. The foraminations are holes of minute size.

Portions 50 and 51 are in contact with portions 44 and 45 respectively. The beads or rims are disposed in interfitting relation. The collars are oppositely disposed. Annular channel portion 43 is seated in annular groove 35 while portions 44 and 45 are disposed in contact with grooved faces 36 and 37 respectively.

Confronting screen 46 is a second disc 52 having central opening 53 and inner and outer reductions 54 and 55 with annular channel 56 spaced from both forming the concentric surfaces 57 and 58. Each surface is finely grooved in a general radial direction and in opposite directions as at 59 and 60. Grooves 39 and 58 are similarly directed. Grooves 38 and 60 are similarly directed. The periphery of disc 52 is provided with forwardly and inwardly directed passageways 61 for fluid discharge to chamber 67.

Disposed and press fitted into the disc central opening 53 is the base portion 62 having a rearwardly directed cone portion 63 at one end and a flange 64 at its opposite end. The latter is engaged by end 65 of screw 19. Since portion 49 of screen 46 is nested in channel 56 of disc 52, it will be apparent that the two discs with the two screens interposed therebetween will be held in assembled relation, as shown in Fig. 1, under any desired compressive force imposed by screw 19.

Operation is as follows: Liquid to be emulsified is continuously supplied under pressure, the pressure being ascertainable by the gauge not shown, connected to intake chamber 12 at outlet 13. This pressure may be regulated in any conventional manner as by speeding up the pump and the like.

The liquid under pressure enters bore 31 of the rear disc 29 and is deflected radially outward by the cone 63. The liquid is forced through the screens and fine grooves 38 and 60 into annular chamber 66 between the screens and thence through the screens and fine grooves 39 and 59 into the body member, escaping by passageways 61 into the main discharge chamber 67 in said body.

Thus the liquid is forced through minute perforations and through minute grooves traveling in a tortuous path through the emulsifier proper. From this chamber it discharges by gravity to discharge line 24 from which it may be discharged direct for use or to a collection container, not shown, from which it may be drawn as desired or required.

The liquid so emulsified, if of milk and/or cream type, by test has a lower bacteria count, keeps longer, tastes much richer, and has a creamier texture than homogenized milk.

From the foregoing it will be noted that the supply is uniformly distributed to the emulsifier and since the travel is generally radially outward the structure is of self-relieving type for the discharge end gradually increases. Furthermore, when the liquid supply is cut off the screw 19 can be backed out and the discs and screens readily removed when the body and fixture are separated. This permits cleaning of all parts.

It has been ascertained that the screens are subjected to greatest wear and since same may be of stamped Monel metal or the like they are comparatively inexpensive to replace when unduly worn.

While the invention has been illustrated and described in great detail in the drawings and foregoing description, the same is to be considered as illustrative and not restrictive in character.

The specific modification described herein, as well as others which will readily suggest themselves to persons skilled in this art, all are considered to be within the broad scope of the invention, reference being had to the appended claims.

The invention claimed is:
1. In an emulsifying apparatus having a housing with an intake and an outlet disposed in spaced relation, the combination therewith of a pressure maintained assembly interposed between the inlet and outlet and through which the liquid to be emulsified is forced therethrough by pressure, the assembly comprising confronting discs, and a plurality of foraminated screens of substantially the same effective area of the discs and interposed therebetween, liquid flow being generally radially between the discs.

2. Apparatus as defined by claim 1 wherein the confronting faces of the discs are annularly channeled to form an annular chamber therebetween, the discs at that chamber having oppositely directed portions to form a screen chamber within the annular chamber.

3. Apparatus as defined by claim 1 wherein each confronting face of the disc includes a plurality of substantially coplanar concentric ridges and each ridge has its confronting face minutely grooved, the directions of the grooves being generally radially directed.

4. Apparatus as defined by claim 3 wherein the grooves in adjacent ridges of the same disc are slightly biased to the radial direction.

5. Apparatus as defined by claim 4 wherein the grooves in adjacent ridges are oppositely directed.

6. In an emulsifying apparatus having a housing with an intake and an outlet disposed in spaced relation, the combination therewith of a pressure maintained assembly interposed between the inlet and outlet and through which the liquid to be emulsified is forced therethrough by pressure, the assembly comprising confronting discs, and a plurality of foraminated screens of substantially the same effective area of the discs and interposed therebetween, liquid flow being generally radially between the discs, the confronting faces of the discs being annularly channeled to form an annular chamber therebetween, the discs at that chamber having oppositely directed portions to form a screen chamber within the annular chamber, and wherein each ridge has its confronting face minutely grooved, the directions of the grooves being generally radially directed.

7. Apparatus as defined by claim 6 wherein the grooves in adjacent ridges of the same disc are slightly biased to the radial direction.

8. Apparatus as defined by claim 7 wherein the grooves in adjacent ridges are oppositely directed.

9. In an emulsifying apparatus having a housing with an intake and an outlet disposed in spaced relation, the combination therewith of a pressure maintained assembly interposed between the inlet and outlet and through which the liquid to be emulsified is forced therethrough by pressure, the assembly comprising confronting discs, and a plurality of foraminated screens of substantially the same effective area of the discs and interposed therebetween, liquid flow being generally radially between the discs, the screens including similarly directed peripheral rims for interfitting purposes and oppositely directed central collar portions.

10. Apparatus as defined by claim 9 wherein each screen between the rim and collar portion includes a plurality of annular portions, axially offset with respect to each other.

11. Apparatus as defined by claim 10 wherein two of said annular portions of each screen contact similar portions of the adjacent screen to form a screen chamber therebetween.

12. Emulsifying apparatus comprising a pair of confronting discs, a plurality of screens of substantially similar area disposed therebetween and of an effective area substantially that of the discs, a housing enclosing said discs and screens and providing an abutment for one disc, and a clamp screw carried by the housing and engaging the other disc for clamping the discs and screens together for liquid pressure separation resistance.

13. Apparatus as defined by claim 12 wherein a handle type lock nut is mounted on the screw external of the housing and is engageable thereon for screw locking purposes.

JOHN H. GARDNER.

REFERENCES CITED

The following references are of record in the file of this patent:

UNITED STATES PATENTS

| Number | Name | Date |
|---|---|---|
| 1,131,368 | Grelck | Mar. 9, 1915 |
| 1,581,223 | Moore | Apr. 20, 1926 |
| 2,075,589 | Munz | Mar. 30, 1937 |
| 2,389,486 | Colony | Nov. 20, 1945 |

FOREIGN PATENTS

| Number | Country | Date |
|---|---|---|
| 27,496 | Netherlands | Feb. 15, 1932 |